UNITED STATES PATENT OFFICE.

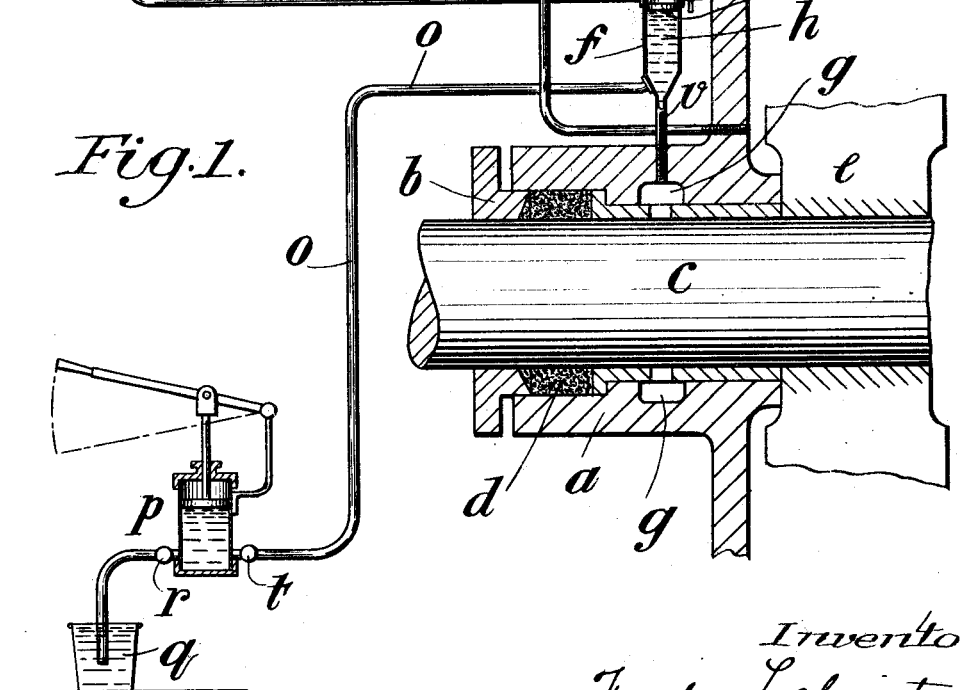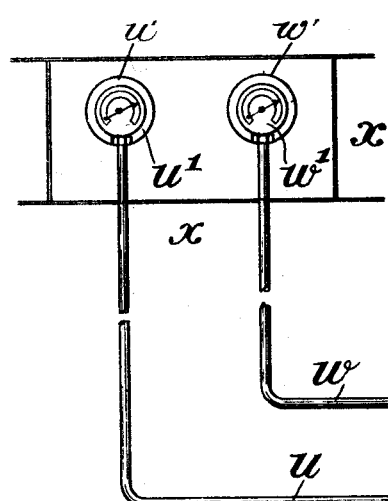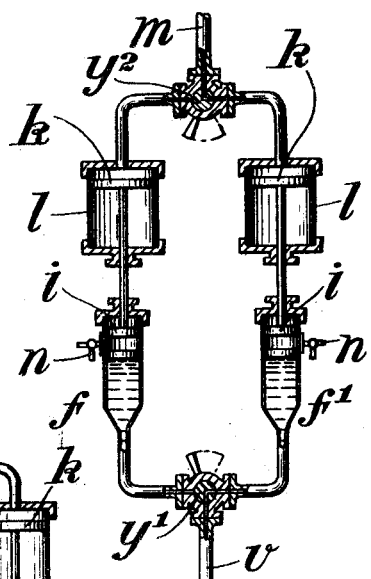

FRED LOBNITZ, OF CROOKSTON, SCOTLAND.

CENTRIFUGAL PUMP.

1,086,063.  Specification of Letters Patent.  Patented Feb. 3, 1914.

Application filed November 9, 1912. Serial No. 730,359.

*To all whom it may concern:*

Be it known that I, FRED LOBNITZ, a subject of the King of Great Britain, residing at Crookston, Renfrewshire, Scotland, have invented certain new and useful Improvements Relating to Centrifugal Pumps, of which the following is a specification.

This invention relates to centrifugal pumps, used either singly or in series, and especially to pumps of this class as generally used for dredging clay or sand or dealing with gritty liquids and discharging the same at long distances or to high lifts. In such pumps there is always a liability, where there is a varying pressure within the pump and in the vicinity of the pump shaft, of the pressure on the one hand becoming sufficiently great to force the gritty liquid into the shaft bearing, which not only deprives the latter of its proper supply of lubricant but also is apt to do considerable damage, as the shafts of such pumps are usually revolved at very high speeds, or, on the other hand, falling of the pressure to such extent that the lubricant, which is usually either forced or mechanically fed, will escape freely from the bearing and be quickly wasted. Under the present invention these drawbacks are overcome by providing means whereby, as the pressure varies in the pump, the pressure acting on the lubricant and feeding it will automatically vary correspondingly, so that, if the pressure in the vicinity of the pump shaft increases, the pressure on the lubricant will also increase automatically and thereby insure the proper lubrication of the shaft and the exclusion of gritty liquid, and, if the pressure falls in the vicinity of the pump shaft, the pressure on the lubricant will also automatically fall and thereby avoid unnecessary waste of lubricant. Means are provided whereby one gage in the pilot house or other suitable place, will show the pressure acting on the lubricant and another gage will show the pressure in the pump, the operator thereby being enabled to see at a glance, whether the lubricant is being properly fed by the pressure thereon or is in danger of being forced back by the pressure inside the pump. The lubricant is fed by the action of fluid pressure, pref- Should the supply of lubricant at any time become exhausted the attention of the operator will, at once, be drawn thereto by the alteration in the readings of the pump gages before mentioned. If so desired automatic means, or means controlled by the operator, may be provided whereby, when one source of lubricant supply is exhausted another can be put in action.

In order that the invention may be clearly understood, I have shown, by way of example, on the accompanying sheet of drawings, a method of carrying out the same.

Figure 1 shows, in section, a pump shaft bearing and also the means for lubricating the same. Fig. 2 shows an arrangement of two sources of lubricant supply, the one to be turned on when the other is exhausted.

On the drawings the same reference letters wherever repeated indicate the same or similar parts.

*a* represents the pump shaft bearing with stuffing box, *b* the stuffing gland, *c* the shaft, *d* the shaft packing, and *e* the impeller. The lubricant, preferably grease, is supplied from a vessel *f* having a pipe connection *v* leading to the chamber *g* of the shaft bearing *a*.

*h* represents the lubricant in the vessel and upon this lubricant rests a floating piston *h'*. In the vessel *f* there is a second piston *i* which is connected by means of a piston rod *j*, with a piston *k* in a cylinder *l* which cylinder has a pipe connection *m* leading to the vicinity of the pump shaft. An air space *s* is left between the floating piston *h'* and the piston *i* and air can be forced into this space, by means of a pump or otherwise, so as to fill the same to a desired pressure. To facilitate the filling of the air space with air under pressure a branch *n* is provided and has a cock thereon. This branch can be put in communication with an air pump and the cock opened to allow compressed air to enter into the vessel *f* and thereafter the cock can be closed. As the pressure within the centrifugal pump increases it forces down the piston *k* and, consequently, also the piston *i* compressing the air between the piston *i* and the floating piston *h'* and thereby forcing the lubricant into the bearing with an increased pressure corresponding to the increase of pressure within the pump. When the pressure decreases within the pump the pressure on the piston $k$ also decreases and the compressed air between the pistons $i$ and $h'$ is allowed to expand thereby reducing the pressure on the lubricant. The piston $k$ is, as illustrated, of greater diameter than the piston $i$ and, in consequence thereof, lubricant is supplied to the bearing or bearings at a pressure per unit area greater than the pressure per unit area within the pump.

In order to fill up the lubricant supply vessel readily when desired, I may connect it by means of a pipe $o$, with a small suction and force pump $p$, adapted to be operated by hand or power, as found most desirable. By operating the pump lubricant can be drawn from a bucket $q$ into the pump cylinder through a suitable non-return valve $r$ and then be forced out through a suitable valve $t$ into the pipe $o$, and vessel $f$ filling the same below the floating piston and at the same time forcing back both pistons $h'$, $i$.

$u$ is a pipe leading from the air space $s$ to a gage $u'$ in the pilot house $x$ or engine room or other suitable position. $w$ is a pipe leading from the pipe $m$ to a gage $w'$ in the vicinity of the gage $u'$. By means of these gages the pressure in the space $s$ acting on the lubricant and the pressure in the pump can be indicated to the operator.

In Fig. 2 I have shown a duplex arrangement with two lubricant supply vessels $f$, $f'$. In this case the vessels $f$, $f'$, are connected by a two way cock $y'$ to the pipe $v$ and the cylinders $l$ are connected by a two way cock $y^2$ to the pipe $m$. By turning the cocks $y'$, $y^2$ either of the devices can be put into operative connection with the pipe $v$. The cocks can be operated by hand or they may be arranged to be operated electrically, pneumatically, or mechanically in any well known and suitable manner whenever the lubricant in one of the vessels ($f$ or $f'$,) is exhausted, so as to turn on a supply of lubricant from the other vessel.

Of course the parts of the mechanism would be made in proportions suitable for the pump.

Having now fully described my invention, what I claim and desire to secure by Letters Patent is:—

1. The combination with a centrifugal pump, of a vessel containing lubricant and in communication with the pump shaft bearing, a piston in the lubricant vessel, a second piston in said vessel, a fluid interposed between said pistons and means for admitting pressure fluid from the pump to the back of the said second piston.

2. The combination with a centrifugal pump, of a vessel containing lubricant and in communication with the pump shaft bearing, a piston in the lubricant vessel, a second piston in said vessel an air space between said pistons, and means for admitting pressure fluid from the pump to the back of said second piston.

3. The combination with a centrifugal pump, of a vessel containing lubricant and in communication with the pump shaft bearing, a piston in the lubricant vessel, a second piston in said vessel, an air space between said pistons and filled with air under pressure, and means for admitting pressure fluid from the pump to the back of said second piston.

4. The combination with a centrifugal pump, of a vessel containing lubricant and in communication with the pump shaft bearing, a piston in the lubricant vessel, a second piston in said vessel, an air space between said pistons, a pipe with gage thereon communicating with said air space, and means for admitting pressure fluid from the pump to the back of said second piston.

5. The combination with a centrifugal pump, of a vessel containing lubricant and in communication with the pump shaft bearing, a piston in the lubricant vessel, a second piston in said vessel, an air space between said pistons, means for indicating the pressure in the pump, and means for admitting pressure fluid from the pump to the back of said second piston.

6. The combination with a centrifugal pump of a vessel containing lubricant and in communication with the pump shaft bearing, a piston in the lubricant vessel, a second piston in said vessel, an air space between said pistons, a cylinder, a piston in the cylinder and connected with the second piston in the lubricant vessel and means for admitting pressure fluid from the pump to said cylinder.

7. The combination with a centrifugal pump of a vessel containing lubricant and in communication with the pump shaft bearing, a piston in the lubricant vessel, a second piston in said vessel, an air space between said pistons, a pipe with gage thereon communicating with said air space, a pipe with gage thereon communicating with the pump, a cylinder of greater diameter than the lubricant vessel, a piston in the cylinder and connected with the second piston in the lubricant vessel and means for admitting pressure fluid from the pump to said cylinder.

8. The combination with a centrifugal pump, of two vessels each containing lubricant, a pipe leading therefrom to the shaft bearing, two pistons in each vessel with compressed air therebetween, a pipe connection from the interior of the pump to two cylinders, a piston in each cylinder said cylinder pistons being each connected to one of the pistons in each lubricant vessel, means whereby one or other of the lubricant vessels can be put into communication with the pipe leading to the shaft bearing, and means whereby one or other of the cylinders can be put into communication with the pipe leading to the interior of the pump.

In testimony whereof I affix my signature in presence of two witnesses.

FRED LOBNITZ.

Witnesses:
H. D. FITZPATRICK,
MARGARET FINDLAY YOUNG.